US011647048B2

(12) United States Patent
Misra et al.

(10) Patent No.: US 11,647,048 B2
(45) Date of Patent: May 9, 2023

(54) REAL-TIME FEEDBACK SERVICE FOR RESOURCE ACCESS RULE CONFIGURATION

(71) Applicant: Visa International Service Association, San Francisco, CA (US)

(72) Inventors: Navendu Misra, Austin, TX (US); Gajanan Chinchwadkar, Fremont, CA (US); Praveen Guggarigoudar, Cedar Park, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 27 days.

(21) Appl. No.: 17/282,317

(22) PCT Filed: Oct. 3, 2018

(86) PCT No.: PCT/US2018/054208
§ 371 (c)(1),
(2) Date: Apr. 1, 2021

(87) PCT Pub. No.: WO2020/072049
PCT Pub. Date: Apr. 9, 2020

(65) Prior Publication Data
US 2021/0326883 A1 Oct. 21, 2021

(51) Int. Cl.
G06Q 20/40 (2012.01)
G06K 9/62 (2022.01)
G06V 10/75 (2022.01)

(52) U.S. Cl.
CPC ....... *G06Q 20/4016* (2013.01); *G06K 9/6267* (2013.01); *G06Q 20/405* (2013.01); *G06V 10/758* (2022.01)

(58) Field of Classification Search
None
See application file for complete search history.

(56) References Cited

U.S. PATENT DOCUMENTS 7,292,960 B1  11/2007  Srinivasa et al.
11,132,614 B2  9/2021  Chinchwadkar et al.
(Continued)

FOREIGN PATENT DOCUMENTS

CN  106067886 A  11/2016
CN  106133675 A  11/2016

OTHER PUBLICATIONS

Dewitt, et al., Equi-Depth Histograms for Estimating Selectivity Factors for Multi-Dimensional Queries, ACM SIGMOD Record vol. 17 Issue 3 Jun. 1988 pp. 28-36 https://doi.org/10.1145/971701.50205 (Year: 1988).*

(Continued)

*Primary Examiner* — Gregory S Cunningham, II
(74) *Attorney, Agent, or Firm* — Kilpatrick Townsend & Stockton LLP

(57) ABSTRACT

A method is disclosed. A server computer may receive, from a client computer, a first rule comprising one or more variables, the first rule configured to predict that an event is either a first classification or a second classification. The server computer applies the first rule to an initial data set of events to identify events that are associated with the first classification. The server computer evaluates performance of the first rule. The server computer provides data relating to the performance of the first rule to the client computer. The client computer automatically evaluates the performance of the first rule and generates a second rule in response to the data relating to the performance of the first rule. The server computer may then evaluate the second rule and provide performance data to the client computer. The (Continued)

server computer may use equi-height histograms to evaluate the performance of the rules.

17 Claims, 9 Drawing Sheets

(56) References Cited

U.S. PATENT DOCUMENTS

| | | | |
|---|---|---|---|
| 2004/0120488 A1 | 6/2004 | Dempsey et al. | |
| 2010/0287099 A1 | 11/2010 | Liu et al. | |
| 2011/0010209 A1* | 1/2011 | McNally | G06N 20/00 706/47 |
| 2012/0101930 A1 | 4/2012 | Li et al. | |
| 2013/0276055 A1 | 10/2013 | Jacobson | |
| 2014/0058763 A1* | 2/2014 | Zizzamia | G06Q 10/10 705/4 |
| 2014/0282856 A1 | 9/2014 | Duke et al. | |
| 2015/0379427 A1* | 12/2015 | Dirac | G06N 20/00 706/12 |
| 2016/0364650 A1 | 12/2016 | Fletcher et al. | |
| 2017/0070523 A1* | 3/2017 | Bailey | G06F 16/9535 |
| 2017/0124487 A1* | 5/2017 | Szeto | G06F 11/1448 |
| 2018/0152478 A1 | 5/2018 | Zhou et al. | |
| 2019/0362254 A1 | 11/2019 | Chinchwadkar et al. | |

OTHER PUBLICATIONS

International Search Report and Written Opinion received for International Application No. PCT/US2018/054208, dated Jul. 2, 2019, 10 pages.

Shiau et al., "A Histogram Matching Approach for Assessment of Flow Regime Alteration: Application to Environmental Flow Optimization", River Research and Applications, Research Article, vol. 24, No. 7, 2008, 15 pages.

"Accurate Estimation of the Number of Tuples Satisfying a Condition" by Gregory Piatetsky-Shapiro and Charles Connell (in SIGMOD '84: Proceedings of the 1984 ACM SIGMOD International Conference on Management of Data (Jun. 1984), pp. 256-276).

First Office Action received for Chinese Appl. No. 201880098362.5 dated Oct. 20, 2022, 16 pages.

Written Opinion received for Singapore Appl. No. 11202103228W dated Nov. 15, 2022, 8 pages.

* cited by examiner

| Node | Content |
|---|---|
| ?=?xml | version="1.0" |
| ▼ e RTDRuleFile | |
| ▲ e batchTransferControlData | |
| ▼ e RTDRule  130 | |
| e rtdRuleID | 60538881 |
| ▼ e rtdCriteria  132A | |
| e criterialD | 131487 |
| e criteriaOrGroupID | 0 |
| e fieldName  134A | panFirstDigits |
| e operation  136A | BETWEEN |
| e fieldValue  138A | 433430000 |
| e fieldValue  138B | 433439999 |
| ▼ e rtdCriteria  132B | |
| e criterialD | 131489 |
| e criteriaOrGroupID | 0 |
| e fieldName  134B | CountryPhoneCode |
| e operation  136B | NOT |
| e fieldValue  138C | 1 |
| ▼ e rtdAction | |
| e rtdActionCode  140 | Decline |
| e additionalRuleAction | 000000000000000 |

FIG. 1B

REAL-TIME FEEDBACK SERVICE FOR RESOURCE ACCESS RULE CONFIGURATION

This application is a National Stage of International Application No. PCT/US2018/054208, filed Oct. 3, 2018, which is herein incorporated by in its entirety.

BACKGROUND

Predictive rules are important in preventing unauthorized access to resources. A rule may be used to predict whether an attempt to access a resource is being made by a trusted entity or an impostor. The rule may be validated, or tested for accuracy, based on historical data. An access attempt may be granted or denied based on a validated rule.

In a prior system, a user may manually create a set of rules ("ruleset") using a graphical user interface. The ruleset may be submitted to a rule feedback system for validation. However, ruleset validation is generally a lengthy process. The ruleset may be evaluated using long-running programs. For example, the ruleset may be applied to a large database of historical transactions, which can take minutes or even hours to execute. After the rule is validated, evaluation information is submitted to the user. The user may manually reconsider the ruleset and, eventually, submit an updated ruleset for validation.

The methods and systems described herein address these and other problems.

BRIEF SUMMARY

Methods as well as systems accept custom rules and provide feedback on the rules substantially in real-time, permitting the rule submitter to automatically update and resubmit the rules based on the feedback.

One embodiment of the disclosure is directed to a method comprising: receiving, by a server computer from a client computer, a first rule comprising one or more variables, the first rule configured to predict that an event is either a first classification or a second classification, wherein the client computer comprises an automatic rule generator; applying, by the server computer, the first rule to an initial data set of events, each event associated with the first classification or the second classification, to identify events that are associated with the first classification; evaluating, by the server computer, a performance of the first rule; providing, by the server computer, data relating to the performance of the first rule to the client computer, wherein the client computer automatically evaluates the performance of the first rule and generates a second rule in response to the data relating to the performance of the first rule; receiving, by the server computer, the second rule from the client computer evaluating, by the server computer, the performance of the second rule; providing, by the server computer, data relating to the performance of the second rule to the client computer, wherein the client computer automatically evaluates the performance of the second rule and generates a third rule in response to the data relating to the performance of the second rule.

Another embodiment is directed to a system comprising a server computer programmed to perform the above-noted method.

Another embodiment is directed to a method comprising: transmitting, by a client computer to a server computer, a first rule comprising one or more variables, the first rule configured to predict that an event is either a first classification or a second classification, wherein the client computer comprises an automatic rule generator; receiving, by the client computer from the server computer, data relating to performance of the first rule, wherein the server computer generated the data relating to the performance of the first rule by applying the first rule to an initial data set of events, each event associated with the first classification or the second classification, to identify events that are associated with the first classification and evaluating the performance of the first rule; automatically evaluating, by the client computer, the performance of the first rule; generating, by the client computer, a second rule in response to the data relating to the performance of the first rule; transmitting, by the client computer to the server computer, the second rule; receiving, by the client computer from the server computer, data relating to the performance of the second rule; automatically evaluating, by the client computer, the performance of the second rule; and generating, by the client computer, a third rule in response to the data relating to the performance of the second rule.

Another embodiment is directed to a system comprising a client computer programmed to perform the above-noted method.

Further details regarding various embodiments can be found in the Detailed Description and the Figures.

BRIEF DESCRIPTION OF THE DRAWINGS

FIG. 1B shows a screen shot of rules that may be applied according to one or more embodiments.

DETAILED DESCRIPTION

I. Definitions

Figure 1A:
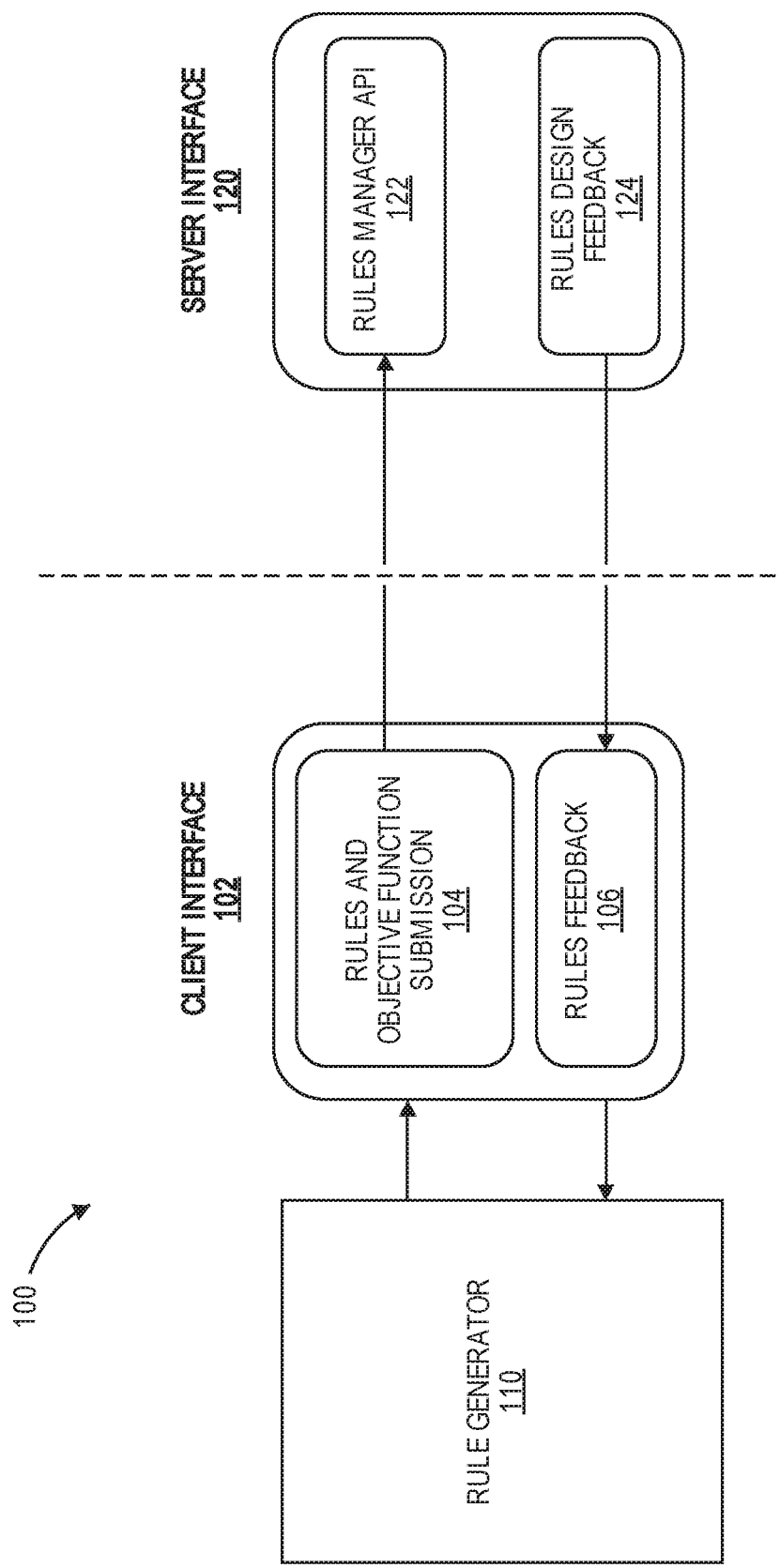
FIG. 1A shows a block diagram of a system according to one or more embodiments.

Prior to discussing various embodiments, some terms can be described in further detail.

"Criteria" may include information used to evaluate one or more pieces of historical data. In some embodiments, criteria may include an age, a size, a date range, an amount, a location, an issuer, or any other suitable attribute of a set of data. For example, criteria may specify that transactions occurring in the last 24 hours be retrieved. Criteria may be combined in some embodiments to develop a rule including multiple criteria, such as, for example, 1/1/18-3/1/18, over $500, and outside of the United States.

"Historical data" may include any data or information that was previously collected and stored in a database or other suitable storage medium. Historical data may include any suitable number of data files. A "data file" may include a collection or set of one or more fields, together forming a record. Exemplary historical data may include historical transaction data files, including transaction amount and other fields, as well as a transaction outcome or determination (e.g., accepted, rejected as fraudulent, on hold, reported as fraudulent, etc.).

A "rule" may include any procedure or definition used to select or identify a subset of a group. As an example, a fraud rule may be used to identify fraudulent or suspect transactions, of a group of transactions. As another example, a college admissions rule may be used to select applicants to admit to a college, of a group of applicants. In some embodiments, a rule may include one or more criteria.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

The term "user" may refer to an individual or entity. The user may be an individual interacting with a user computing device (e.g., a mobile phone or tablet). The user may be a consumer or business that is associated with an account and whose account can be used to conduct transactions, including a payment transaction.

The term "identifier" may refer to any information that may be used to identify information. In some embodiments, the identifier may be a special value generated randomly or according to a predetermined algorithm, code, or shared secret. For example, an authorizing entity identifier may be a value or number associated with a authorizing entity (e.g., a bank identification number). In another example, an account identifier may be used to uniquely identify an account (e.g., a Primary Account Number (PAN)). In some embodiments, the identifier may be one or more graphics, a token, a bar code, a QR code, or any other information that may be used to uniquely identify an entity.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

The term "transaction data" may include data that regarding a transaction. Transaction data may include data for a specific transaction, including items purchased, item prices, total cost, shipping address, payment methods, merchant data, etc. In some embodiments, transaction data may be generated when the user attempts to initiate a transaction for processing. In other embodiments, transaction data may be generated and sent based on items added to a user's shopping cart. Transaction data may also include historical transaction data for prior transactions.

The term "objective function" may refer to a function to be maximized or minimized. As an example, a root-mean-square objective function may be minimized to bring mathematically predicted values closer to the values in a historical data set.

II. Systems

FIG. 1A shows a system 100 which illustrates a use-case according to some embodiments. The system 100 may comprise a rule generator 110, a client interface 102, and a server interface 120.

FIG. 1A shows a system 100 comprising a number of components. For simplicity of illustration, a certain number of components are shown in FIG. 1A. It is understood, however, that embodiments may include more than one of each component. Other arrangements may include fewer or different components, and the division of work between the components may vary depending on the arrangement.

In some embodiments, the rule generator 110 includes software and/or hardware configured to create and update rules. The rule generator 110 may be automated. The rule generator 110 may operate on the back end of the client system. The rule generator 110 may be communicatively coupled to the client interface 102. The rule generator 110 may transmit a generated ruleset to the client interface 102. The rule generator 110 may further generate an objective function for use in evaluating the generated rule(s). The rule generator 110 may transmit the objective function to the client interface 102.

The rule generator 110 may further receive rule feedback via the client interface 102, based on the transmitted rule(s). Based on the rule feedback, the rule generator 110 may update the initial ruleset to generate an updated ruleset. The rule generator may submit the updated ruleset to the client interface 102 for evaluation. The cycle of submitting updated rules and receiving feedback thereupon may continue until the rules are optimized to a level deemed acceptable.

In some embodiments, the client interface 102 includes hardware and/or software configured to receive and transmit rules, rule feedback, and/or objective functions. The client interface 102 may include a rules and objective function submission component 104 and a rules feedback component 106.

In some embodiments, the rules and objective function submission component 104 submits a generated ruleset to the server interface 120 for validation. The rules and objective function submission component 104 may further submit an objective function to the server interface 120, for use in evaluating one or more rulesets. The rules and objective function submission component 104 may, for example, access the rules manager Application Programming Interface (API) 122 of the server interface 120 to push the ruleset and objective function to the server interface.

In some embodiments, the rules feedback component 106 collects feedback from the server interface 120. The rules feedback component 106 may further provide the received feedback to the rule generator 110 for modifying the initial ruleset.

The server interface 120 may include a rules manager Application Programming Interface (API) 122 for receiving rules and/or objective functions. The server system may evaluate a received ruleset to generate rules design feedback 124 describing the performance of a received ruleset. The rules design feedback 124 may, for example, be a numerical value computed based on the objective function and the rule or ruleset compared to historical data. The rules manager API 122 may transmit rules design feedback 124 to rules feedback component 106 of the client interface 102.

FIG. 1B shows an example screen shot of a rule file 150. The rule file includes various components making up a rule 130. The rules are simple conditions on various data fields. As shown in FIG. 1B, a rule 130 may include multiple criteria (132A, 132B). Each criterion is like a search condition. The rule shown in FIG. 1B consists of two criteria:

1. PANFirstDigits BETWEEN 433430000 AND 433439999
2. CountryPhoneCode NOT 1

The first criterion is that the first digits of the PAN are between 433430000 and 433439999. The second criterion is that the country phone code is not equal to 1. A criterion may include a field (134A, 134B), an operator (136A, 136B), and one or more values (138A, 138B, 138C). A field (also referred to herein as a "variable") is an attribute upon which the rule depends. As examples, rules may be determined based on variables such as age, amount, transaction channel, geographic region, etc. In the example illustrated in FIG. 1B, PANFirstDigits and CountryPhoneCode are two fields of interest.

Each criterion may be compared to a value using comparison operators (e.g., EQUALS, NOEQUALS, GREATERTHAN, etc.). The values may be, for example, numerical values and/or strings (e.g., 5,000 or Asia). The criteria making up a rule may be connected with connectors (e.g. AND, OR, etc.). For example:

transactionAmt GREATER-THAN 3000 AND merchantLocation EQUALS "Moscow".

Based on the criteria, the rule may provide an action 140 to perform. According to the rule illustrated in FIG. 1B, if both the criteria are satisfied, then the rule provides the action "decline."

Figure 2:
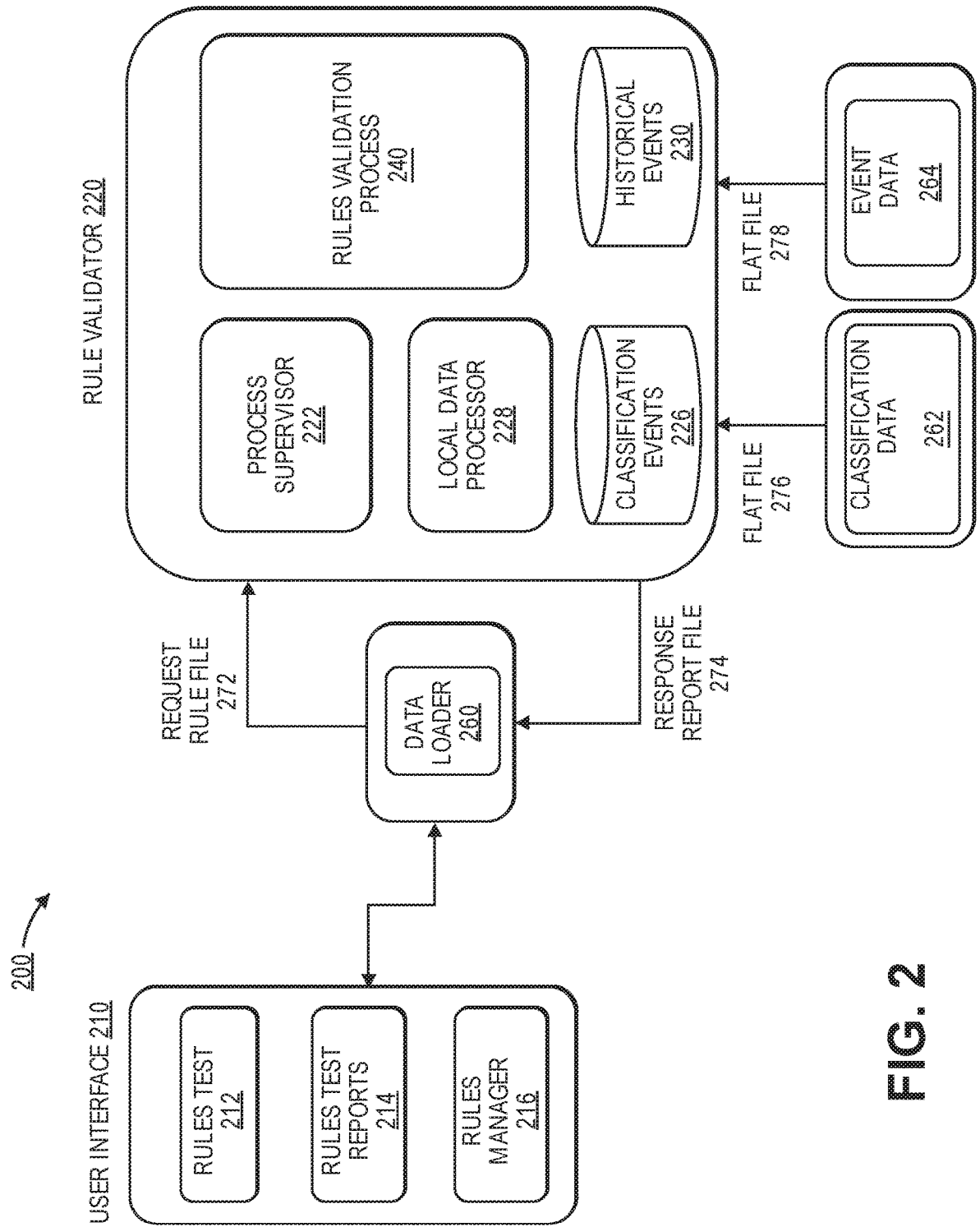
FIG. 2 shows a block diagram of a rule validation system according to one or more embodiments.

FIG. 2 shows a block diagram of a rule validation system 200 according to one prior system. The rule validation system 200 may include a user interface 210, rule validator 220, and data loader 260.

FIG. 2 shows a system comprising a number of components. For simplicity of illustration, a certain number of components are shown in FIG. 2. It is understood, however, that embodiments may include more than one of each component. Other arrangements may include fewer or different components, and the division of work between the components may vary depending on the arrangement.

The user interface 210 may include hardware and/or software configured to accept user input defining rules and to provide the user with feedback on the rules. The user interface 210 may include a rules test component 212, rules test report component 214, and rules manager 216.

The rules manager 216 may include functionality for accepting rules for validation. The rules manager 216 may include functionality to accept user input specifying a rule. For example, the rules manager 216 may display a text entry field for accepting a typed rule. As another example, the rules manager 216 may display interface elements for a user to upload a rule file specifying rule parameters. As another example, the rules manager 216 may display interface elements for a user to enter and adjust various rule parameters.

The rules test component 212 may include functionality to submit rules to the rule validator 220 for validation. The rules test component 212 may, for example, transmit a rule file to the data loader 260.

The rules test report component 214 may include functionality to provide rule feedback to a user. The rules test report component 214 may display information indicative of the effectiveness of a user-submitted rule, to the user. The user may then may manually adjust the rules based on the report.

The data loader 260 may include hardware and/or software configured to transmit rules and rule reports between the user interface 210 and the rule validator 220. The data loader 260 may include functionality to submit a user-provided rule file 272 to the rule validator 220. The data loader 260 may further include functionality to accept rule feedback from the rule validator 220 and transmit the rule feedback to the user interface 210. The data loader 260 may receive a response report file 274 from the rule validator 220 and forward the response report file 274 to the user interface 210.

The rule validator 220 includes hardware and/or software configured to test received rules. Rule validator 220 may include a process supervisor 222, local data processor 228, and rules validation process 240. Rule validator 220 may further include a classification events database 226 and a historical event database 230.

The historical events database 230 may be a storage unit and/or device (e.g., a file system, database, collection of tables, or other storage mechanism) for storing data. The historical events database 230 may include multiple different storage units and/or devices. The historical events database 230 may be populated with event data 264.

The event data 264 is data associated with events. The events may be, as nonlimiting examples, payment transactions, attempts to access a building, or attempts to log on to a secure network. The event data 264 may be received from, for example, remote computers, clients, and/or other users. As an example, data about payment transactions may be obtained from a payment management service. The event data 264 may be provided to the historical events database 230 in flat file format 278.

The classification events database 226 may be a storage unit and/or device (e.g., a file system, database, collection of tables, or other storage mechanism) for storing data. The classification events database 226 may include multiple different storage units and/or devices. The classification events database 226 may be populated with classification data 262.

The classification data 262 is data corresponding to events that are associated with a classification. As an example, the classification data 262 may be fraud data associated with fraudulent transactions, received from issuers and/or cardholders. As another example, the classification data 262 may be admissions data about students admitted to an educational institution, received from educational institutions and/or students. The classification data 262 may be received from, for example, remote computers, clients, and/or other users. The classification data 262 may be provided to the classification events database 226 in flat file format 276.

The local data processor 228 may be implemented as one or more integrated circuits (e.g., one or more single core or multicore microprocessors and/or microcontrollers). The local data processor 228 may be used to control the operation of the rule validator 220. Local data processor 228 can execute a variety of programs in response to program code or computer-readable code stored in memory (not pictured).

Local data processor 228 may include functionality to maintain multiple concurrently executing programs or processes.

The rules validation process 240 may be configured to validate a received rule. The rules validation process 240 may be configured to assess event data 264, stored to the historical event database 230, based on one or more received rules. As an example, the rules validation process 240 may, in cooperation with the local data processor 228, apply a fraud rule to 20 million payment transactions to identify a subset of the transactions that the rule would flag as fraudulent. The rules validation process 240 may further be configured to compare the transactions caught by the rule to actual fraudulent transactions in the classification events database 226. Based on the comparison, the rules validation process 240 may be configured to generate a response report file 274 indicating the effectiveness of the rule. The results of the rule validation may be stored to the classification event database 226.

The process supervisor 222 may be configured to coordinate the various processes within the rule validator 220. As an example, process supervisor 222 may be configured to coordinate transmitting rule files 272 to the rules validation process 240 and transmitting a response report file 274 towards the user interface 210 via data loader 260.

Figure 3:
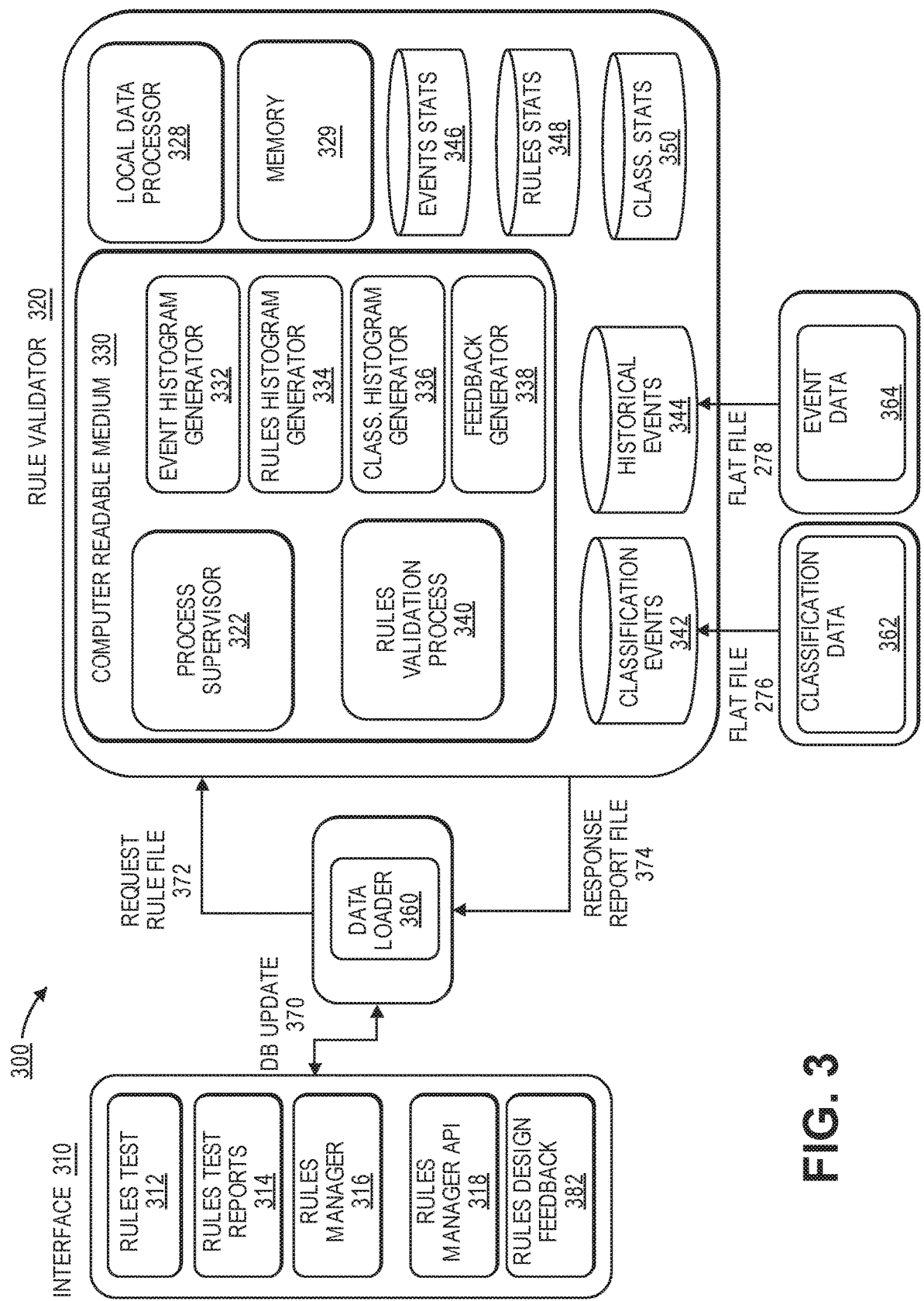
FIG. 3 shows a block diagram of an enhanced rule validation system according to one or more embodiments.

FIG. 3 shows a block diagram of an enhanced rule validation system 300 according to some embodiments. The rule validation system 300 includes an interface 310, a data loader 360, and a rule validator 320.

FIG. 3 shows a system comprising a number of components. For simplicity of illustration, a certain number of components are shown in FIG. 3. It is understood, however, that embodiments may include more than one of each component. Other arrangements may include fewer or different components, and the division of work between the components may vary depending on the arrangement.

In some embodiments, the interface 310 includes hardware and/or software configured to accept rules for analysis. Interface 310 may include a rules test component 312, rules test reports component 314, rules manager 316, rules manager API 318, and rules design feedback 382.

The rules manager 316 may include functionality to accept rules for validation. The rules manager 316 may be communicatively coupled to an automatic rule generator (e.g., rule generator 110). The rules manager 316 may receive rules transmitted from the rule generator. Alternatively, or additionally, the rules manager 316 may accept a user-submitted rule.

In some embodiments, the rules manager 316 may accept the rules via the rules manager API 318. Objective functions, for evaluating the rules, may also be submitted via the rules manager API 318. The rules manager API may be exposed to the rule generator to accept rule files defining rules to be evaluated.

The rules test component 312 may include functionality to submit rules to the rule validator 320 for validation. The rules test component 312 may, for example, be configured to transmit a rule file, received from the rule generator, to the data loader 360.

The rules test report component 314 may include functionality to provide rule design feedback 382 to the rule generator (see FIG. 1). The rules test report component 314 may, for example, be configured to transmit an objective function value generated by the rule validator 320 to the rule generator. Alternatively, or additionally, the rules test report component 314 may display rules design feedback 382, such as histograms, to a user.

The data loader 360 may include hardware and/or software configured to transmit rules and rule reports between the interface 310 and the rule validator 320. The data loader 360 may transmit a rule file to the rule validator 320 responsive to a received rule file request 372. The data loader 360 may receive a response report file 374 from the rule validator 320. The data loader 360 may transmit rule report information to the interface 310, for example, in the form of a database update 370.

In some embodiments, the rule validator 320 includes hardware and/or software configured to evaluate received rules. Rule validator 320 may include a computer-readable medium 330, local data processor 328, and memory 329. The rule validator 320 may further include a classification events database 343, historical events database, events statistics database 346, rules statistics database, and classification statistics database 350.

The classification events database 342 may be substantially similar to, or different from, the classification events database 242, described above with respect to FIG. 2. The classification events database 342 may be populated with classification data 362, which may be substantially similar to, or different from, the classification data 262. The classification data 362 may be provided to the classification events database 342 in flat file format 276.

The historical event database 344 may be substantially similar to, or different from, the historical event database 244. The historical event database 344 may be populated with event data 364, which may be substantially similar to, or different from, the event data 264. The event data 364 may be provided to the historical events database 344 in flat file format 278.

The memory 329 may be implemented using any combination of any number of non-volatile memories (e.g., flash memory) and volatile memories (e.g., DRAM, SRAM), or any other non-transitory storage medium, or a combination of media.

The local data processor 328 may be implemented as one or more integrated circuits (e.g., one or more single core or multicore microprocessors and/or microcontrollers). The local data processor 328 may be used to control the operation of the rule validator 320. The local data processor 328 can execute a variety of programs in response to program code or computer-readable code stored in the memory 329. Local data processor 328 may include functionality to maintain multiple concurrently executing programs or processes.

In some embodiments, the computer-readable medium 330 comprises code, executable by the local data processor 328, to implement a method comprising: i) receiving, by a server computer from a client computer, a first rule comprising one or more variables, the first rule configured to predict that an event is either a first classification or a second classification, wherein the client computer comprises an automatic rule generator; ii) applying, by the server computer, the first rule to an initial data set of events, each event associated with the first classification or the second classification, to identify events that are associated with the first classification; iii) evaluating, by the server computer, a performance of the first rule; iv) providing, by the server computer, data relating to the performance of the first rule to the client computer, wherein the client computer automatically evaluates the performance of the first rule and generates a second rule in response to the data relating to the performance of the first rule; v) receiving, by the server computer, the second rule from the client computer vi) evaluating, by the server computer, the performance of the second rule; and vii) providing, by the server computer, data relating to the performance of the second rule to the client computer, wherein the client computer automatically evaluates the performance of the second rule and generates a third rule in response to the data relating to the performance of the second rule.

The computer-readable medium 330 may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 330 may be any combination of such storage or transmission devices.

The computer-readable medium 330 may comprise software code stored as a series of instructions or commands The computer-readable medium 330 may comprise a process supervisor 322, rules validation process 340, event histogram generator 332, rules histogram generator 334, classification histogram generator 336, and feedback generator 338.

The process supervisor 322 may be substantially similar to, or different from, the to process supervisor 222, described above with respect to FIG. 2.

In some embodiments, the rules validation process 340 is configured to evaluate received rules. The rules validation process 340 may be configured to assess event data 364, stored to the historical event database 344, based on one or more received rules. As an example, the rules validation process 240 may, in conjunction with the local data processor 328, apply a fraud rule to 20 million payment transactions to identify a subset of the transactions that the rule would flag as fraudulent. The rules validation process 340 may further be configured to compare the transactions caught by the rule to actual fraudulent transactions in the classification events database 342. Based on the comparison, the rules validation process 340 may be configured to generate a response report file 374 indicating the effectiveness of the rule. The rules validation process 340 may be configured to manage the generation of histograms, for use in evaluating the rules, via histogram generators 332, 334, 336.

In some embodiments, the event histogram generator 332 is configured to generate statistics based on the event data 364 stored to the historical event database 344. The event data 364, as stored to the historical event database 344, may include many different fields, as described with respect to FIG. 1B. Depending on whether a field is numeric or non-numeric, various statistics may be generated. For example, for a numeric field, the following statistics may be generated on the values of the field across multiple transactions collected over a defined time-period: a number of values in the available data, a number of distinct values in the available data, minimum and maximum values of the field, mean and standard deviation of values in the field, and/or equi-height histograms of value distribution. Equi-height histograms are further described below with respect to FIG. 4. These statistics may be collected on all the ruleable fields in the transaction data.

In some embodiments, the events statistics database 346 may be a storage unit and/or device (e.g., a file system, database, collection of tables, or other storage mechanism) for storing data. The events statistics database 346 may include multiple different storage units and/or devices. The events statistics database 346 may be populated with the data, such as event histograms, generated by the event histogram generator 332.

The rules histogram generator 334 may comprise code configured to analyze the historical data based on received rules. The rules histogram generator 334 may be configured to apply a rule to a data set (e.g., by querying the historical event database or otherwise filtering the data). The rules histogram generator 334 may further be configured to generate a rule histogram based on the rule-filtered data.

In some embodiments, the rules statistics database 348 may be a storage unit and/or device (e.g., a file system, database, collection of tables, or other storage mechanism) for storing data. The rules statistics database 348 may include multiple different storage units and/or devices. The rules statistics database 348 may be populated with the data, such as rules histograms, generated by the rules histogram generator 334.

The classification histogram generator 336 may comprise code configured to analyze the classification data. The classification histogram generator 336 may be configured to identify data corresponding to a classification (e.g., by retrieving data from the classification event database 342). The classification histogram generator 336 may further be configured to generate a classification histogram based on the data corresponding to the classification.

In some embodiments, the classification statistics database 350 may be a storage unit and/or device (e.g., a file system, database, collection of tables, or other storage mechanism) for storing data. The classification statistics database 350 may include multiple different storage units and/or devices. The classification statistics database 350 may be populated with the data, such as classification histograms, generated by the classification histogram generator 336.

The feedback generator 338 may comprise code configured to generate feedback on received rules. The feedback generator 338 may be configured to compute the value of a received optimization function that quantifies the difference between what the rule predicts and what the historical data reveals. This may be achieved by, for example, comparing a classification histogram, indicative of events in a classification, with a rule histogram, indicative of events predicted by a rule to be in the classification. As an example, the feedback generator 338 may be configured to compare a histogram of fraudulent transactions to a histogram of prior transactions that a fraud rule would have flagged as potentially fraudulent.

The feedback generator 338 may, in conjunction with the local data processor 328, generate rules design feedback 382 for submission to the interface 310. The rules design feedback 382 may comprise one or more values determined based on a received objective function. Alternatively, or additionally, the rules design feedback may include a rules histogram, a classification histogram, and/or information indicating the differences between the rules histogram and the classification histogram for a given rule or ruleset.

Figure 4:
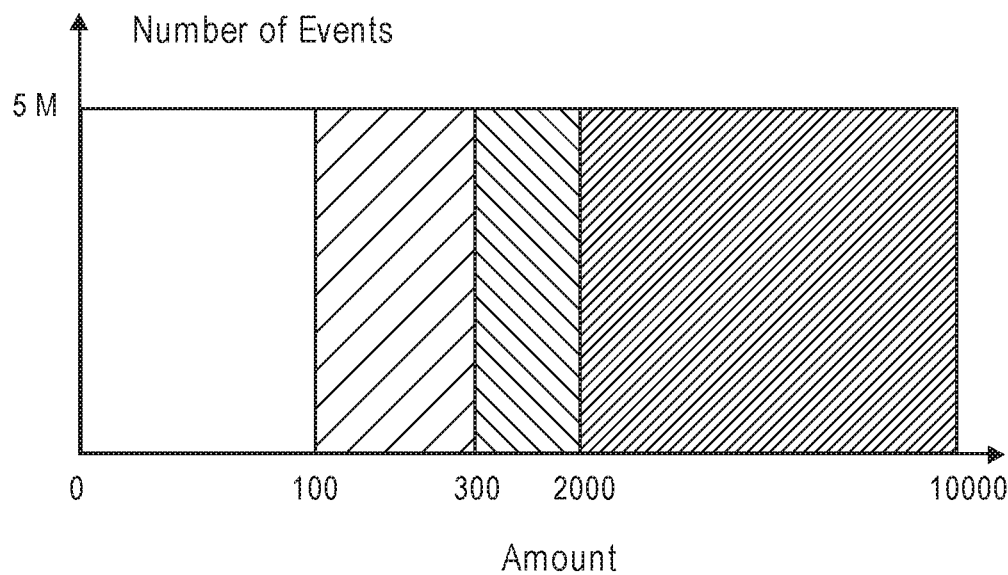
FIG. 4 shows an equi-height histogram of events according to one or more embodiments.

FIG. 4 shows an example of an equi-height histogram 400 in accordance with some embodiments. The field of interest in equi-height histogram 400 is "amount." The amount may, for example, correspond to a dollar amount associated with a payment transaction.

Each column of the histogram is called a bucket (also referred to herein as a "bin"). The buckets are partitioned according to boundaries. For example, the boundaries shown in FIG. 4 are (0, 100, 300, 2000, 10000). The boundaries may be established so as to create an equal number of events in each bucket. Methods of generating an equi-height histogram, and the advantages thereof, are described in detail in the paper entitled "ACCURATE ESTIMATION OF THE NUMBER OF TUPLES SATISFYING A CONDITION" by Gregory Piatetsky-Shapiro and Charles Connell (*in SIGMOD'84: Proceedings of the 1984 ACM SIGMOD International Conference on Management of Data* (June 1984), pp. 256-276).

The equi-height histogram 400 is used to establish the bucket boundaries for the four buckets in the histograms, each respective bucket containing five million events. For example, the events are payment transactions and the amount is a dollar amount associated with the transaction. At the time of histogram generation, there are 5 million transactions, in the historical event database 344, with a transaction dollar value between 0 and $100. Likewise, there are 5 million transactions, in the historical event database 344, with transaction dollar values between $100 and $300, $300 and $2,000, and $2,000 and $10,000, respectively. Once the bucket boundaries are established, the bucket boundaries are used to construct histograms 500-900.

Figure 5:
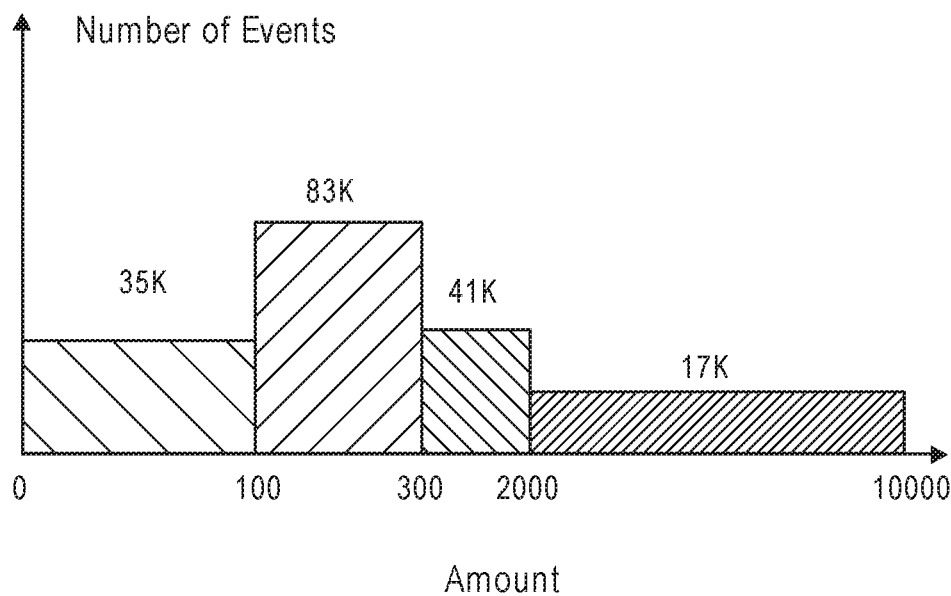
FIG. 5 shows a histogram of events in a classification according to one or more embodiments.

FIG. 5 shows an example of an classification histogram 500 in accordance with some embodiments. A classification histogram 500 corresponds to a subset of events that fall in a classification. As an example, the events are transactions, and the classification of transactions is fraudulent transactions. The y-axis of classification histogram 500 represents the number of fraudulent transactions in a particular bucket. The x axis of the classification histogram 500 represents a dollar amount corresponding to each respective transaction. For instance, there are 35,000 fraudulent transactions with a dollar amount between $0 and $100 and 83,000 fraudulent transactions with dollar amounts between $100 and $300.

A classification histogram 500 may be generated based on data corresponding to a particular classification of event. This data may be obtained from the classification event database 342. The boundaries that were determined via equi-height histogram 400 can be applied to the classification data 362. For example, in FIG. 4, it was established that there are 5 million transactions with dollar amounts between $0 and $100, 5 million transactions with dollar amounts between $100 and $300, etc. Accordingly, the classification data is divided into these same buckets—amount=0–100, amount=100–300, etc., to generate the classification histogram 500.

The process of generating classification histograms 500 based on the bins established using the equi-height histogram 400 may be repeated across fields. The classification histogram generator 336 may produce a plurality of classification histograms 500, corresponding to each of the ruleable attributes in the event data. As an example, three classification histograms 500 may be generated, corresponding to the fields "amount," "country," and "first four digits of PAN."

Figure 6:
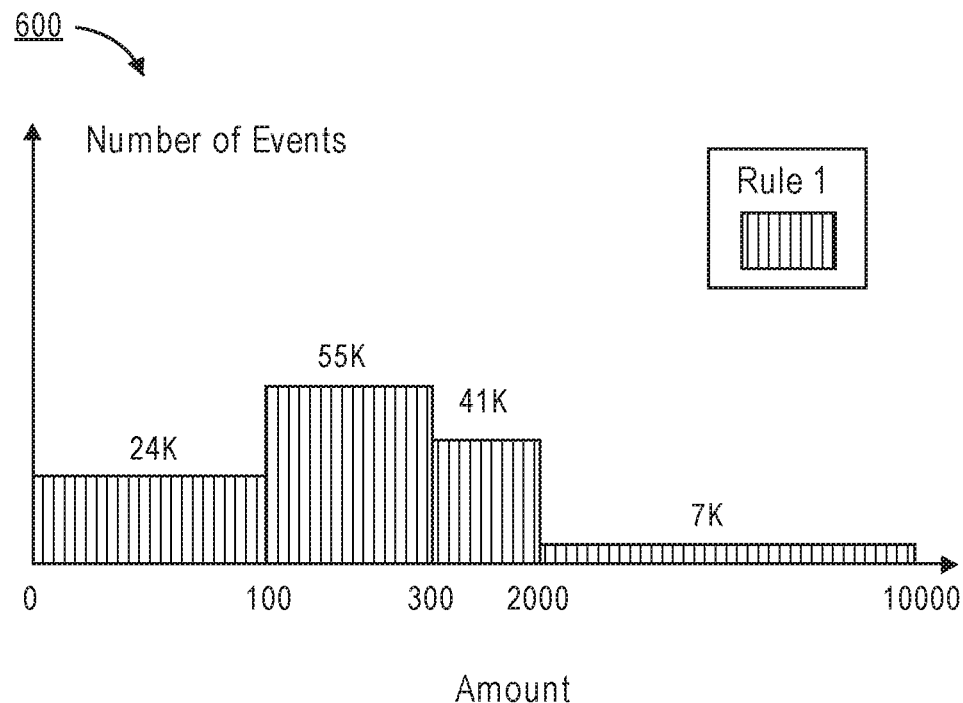
FIG. 6 shows a histogram of events caught by a rule according to one or more embodiments.

FIG. 6 shows an example of rule histogram 600, corresponding to events corresponding to a first rule, in accordance with some embodiments. The rules histogram generator 334 may generate a rule histogram 600 based on data corresponding to a particular rule. This data may be obtained from the historical event database 344. When a set of rules is submitted, these rules are tested (validated) against the event data 364 in the historical event database 344. This creates a smaller result set, which is effectively a set of transactions detected by the rule set. The boundaries, as determined via equi-height histogram 400, can be applied to the event data 364. As an example, the historical event database includes 20 million transactions, both fraudulent and non-fraudulent. The rule validator 320 applies a received fraud rule to the 20 million transactions, identifying 127,000 transactions that would be flagged by the rule as potentially fraudulent. These 127,000 transactions are binned according to the buckets established using the equi-height histogram 400.

Figure 7:
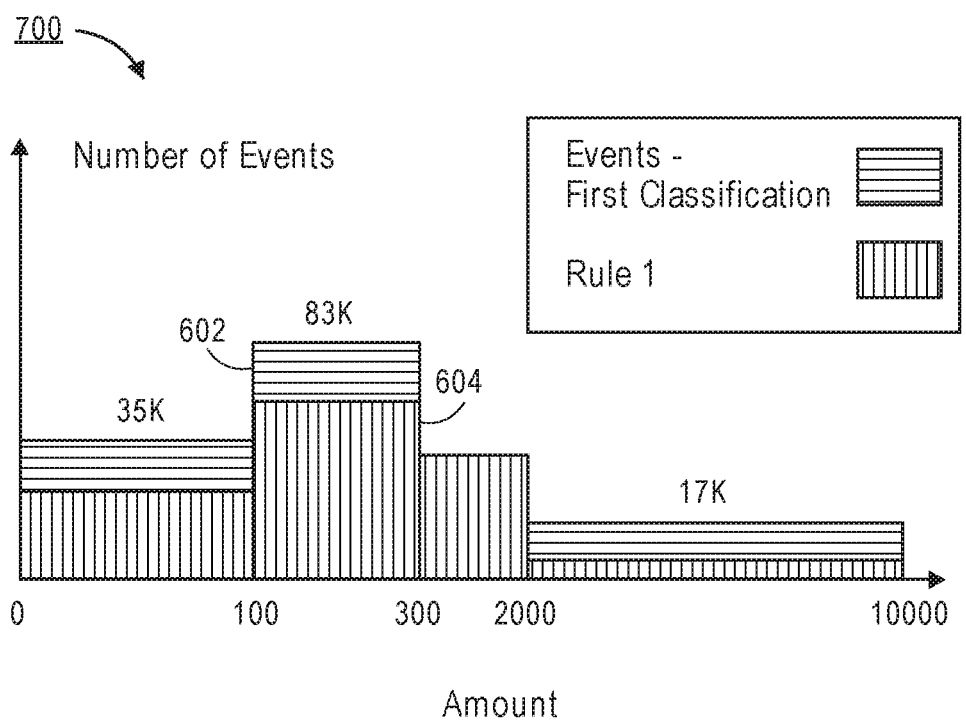
FIG. 7 shows a combined histogram of events in the classification and events caught by the rule according to one or more embodiments.

FIG. 7 shows the classification histogram of FIG. 5 and the rule histogram of FIG. 6 overlaid for comparison. In this case, the rule has underestimated the number of events in each bucket. For each bucket, the rules histogram has smaller size than the classification histogram. For the example of fraudulent transactions, this would indicate that the rules flagged fewer transactions (i.e., number of events in a particular bin of the rules histogram) than the number of actual fraudulent transactions (i.e., number of events in the same bin of the classification histogram, where the classification is fraudulent transactions). If this rule were applied to catch fraudulent transactions, it would result in fraud loss with a significant dollar value.

Figure 8:
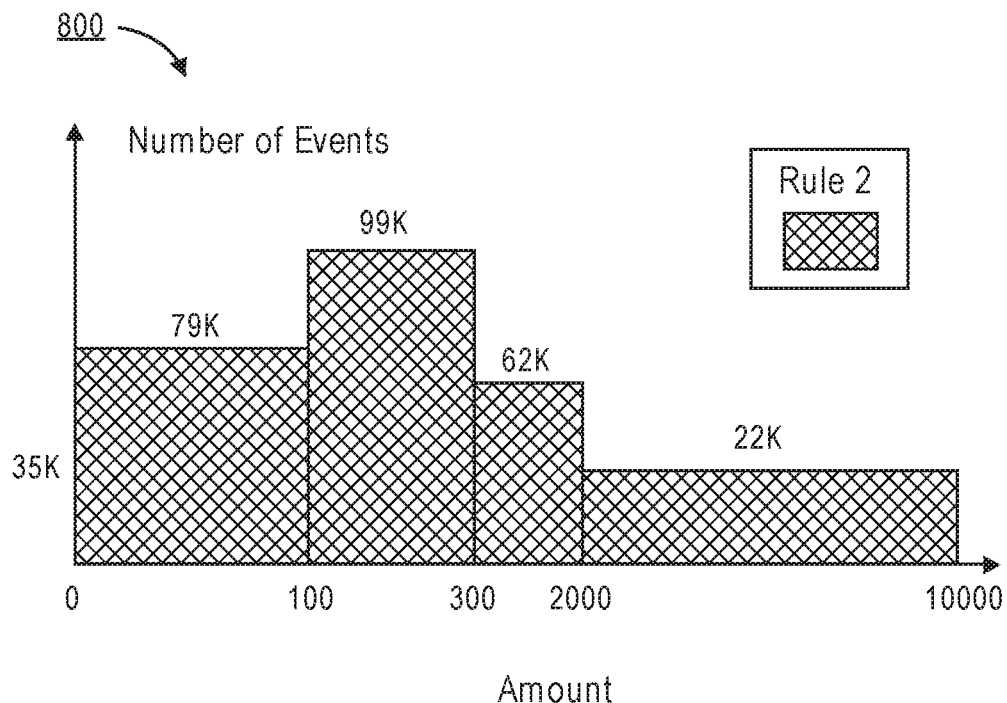
FIG. 8 shows a histogram of events caught by another rule according to one or more embodiments.

FIG. 8 shows an example of rule histogram 800, corresponding to events corresponding to a second rule, in accordance with some embodiments. As with the first rule histogram 600, the second rule histogram 800 is generated by applying a rule to historical data, as well as binning the data caught by the rule according to the bins established by equi-height histogram 400. However, for rule histogram 800, the rule is different than the rule used for rule histogram 600. For example, after finding that the first rule has underestimated fraud as shown in FIG. 7, the system may apply a modified rule to the historical data in an effort to find a more accurate rule.

Figure 9:
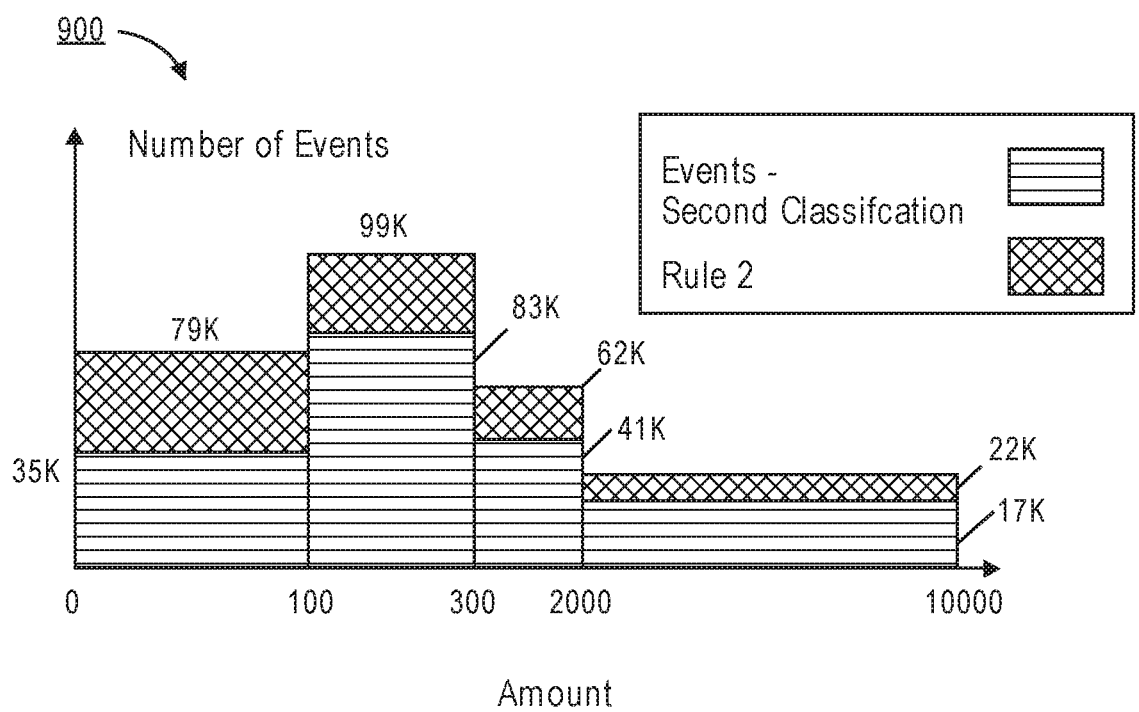
FIG. 9 shows combined histogram of events in the classification and events caught by the other rule according to one or more embodiments.

FIG. 9 shows the classification histogram of FIG. 5 and the rule histogram of FIG. 8 overlaid for comparison. In this case, the rule has overestimated the number of events in each bucket. For each bucket, the rules histogram has a larger size than the classification histogram. For the example of fraudulent transactions, this would indicate that the rules flagged more transactions (i.e., number of events in a particular bin of the rules histogram) than the number of actual fraudulent transactions (i.e., number of events in the same bin of the classification histogram, where the classification is fraudulent transactions). If this rule were applied to catch fraudulent transactions, it would result in false positives. A significant amount of genuine transactions would be denied, resulting in a loss of customer satisfaction.

III. Methods

Figure 10:
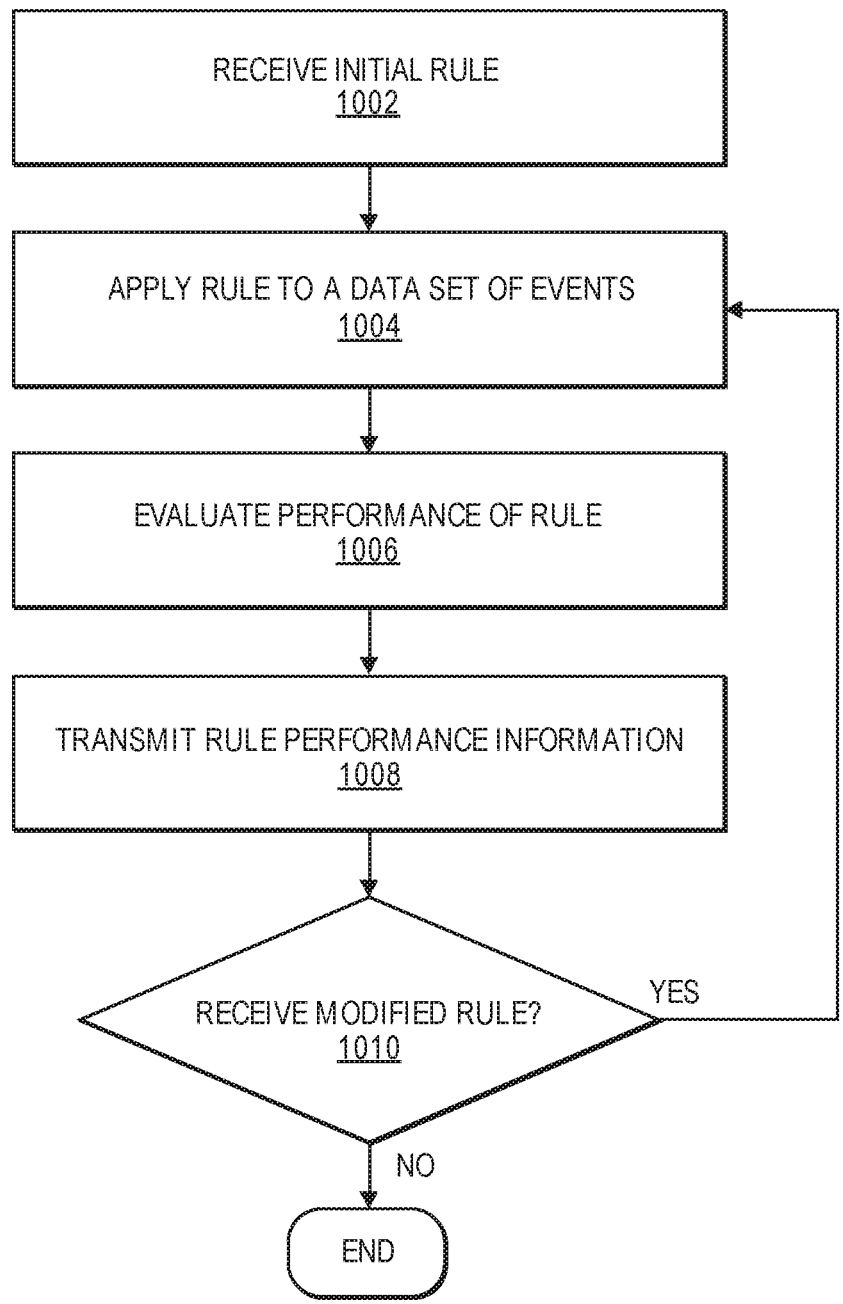
FIG. 10 shows a process flow for evaluating a rule according to one or more embodiments.

A method for providing real-time rule feedback is described with respect to FIG. 10. Although the steps are illustrated in a specific order, it is understood that embodiments may include methods that have the steps in different orders. In addition, in some embodiments, steps may be omitted or added.

Prior to step 1002, an initial rule (which may be an example of a "first rule") may be generated by the rule generator. The rule generator may generate a rule automatically based on, for example, a machine learning algorithm or a mathematical formula. The rule generator may transmit the rule to the rules manager API of the rules validator.

At step 1002, the rule validator receives the initial rule. The rule validator may, for example request a rule file from the data loader via a pull operation. Alternatively, or additionally, the rule generator may push the initial rules to the rule validator as the rules are generated. Similarly, the rules validator may receive an optimization function for analyzing the initial rule.

At step 1004, the rule validator applies the rule to an initial data set of events. The initial data set of events may be retrieved from the historical events database. The rule validator may apply the rule to the initial data set of events by filtering the initial data set of events. As an example, the historical event database contains data corresponding to 100,000 payment transactions. For each transaction, the historical events database stores data corresponding to the data fields AMOUNT, COUNTRY, and MERCHANT ID. The rule validator filters the transactions using the rule IF AMOUNT>10,000 AND COUNTRY=Zimbabwe THEN decline. The rule validator may generate a rules histogram using the data filtered by the rule. Generating a rules histogram is described in further detail below with respect to FIG. 11.

At step 1006, the feedback generator evaluates the performance of the rule. The feedback generator may evaluate the performance of the rule based on comparison of the rule histogram and a classification histogram, as described in detail below with respect to FIG. 11. The feedback generator may compute the value of the optimization function, based on the comparison of the histograms. The optimization function may minimize the sum of differences between the two areas over all the buckets of the histograms.

For example, the feedback generator may evaluate the rule using a weighted square-mean objective function:

$$\Sigma_{k=0}^{n-1} w_k*(C_k-R_k)^2, \quad (1)$$

where k is each bucket, n is the number of buckets in the histogram, C and R define the respective areas in classification data histogram and the rule evaluation histograms buckets, and $w_k$ are the weights for each bucket. As another example, the objective function may be $$\Sigma_{k=0}^{n-1} w_k*(C_k-R_k). \quad (2)$$

In both examples, the objective function includes bucket-specific weights. With the bucket-specific weights, the rule submitter may tailor the rule feedback to focus on a region of interest. As an example, if each bucket corresponds to a dollar range for transactions, the rule submitter may assign weights that increase with the increase in dollar value, so as to focus on rule accuracy for high dollar transactions.

The feedback generator may additionally compute histograms and objective function results based on other data fields. The feedback generator may execute steps 1108-1120 with events associated with a first variable, then repeat steps 1108-1120 with events associated with a second variable. As an example, the feedback generator may evaluate a rule as a function of the field AMOUNT. The feedback generator may then evaluate the rule as a function of the field COUNTRY. The feedback generator may then evaluate the rule as a function of the field FIRST 5 DIGITS OF PAN. The feedback generator may arrive at a value for each of the fields based on the objective function, and aggregate or otherwise combine the values. Alternatively, or additionally, the feedback generator may evaluate a rule based on an objective function which incorporates histogram data from multiple fields.

In addition to the values of the objective functions, the feedback generator may generate additional quantitative or qualitative rule assessments based on historical data. As examples, the feedback generator may determine (a) feedback on a dollar value corresponding to transactions likely to be fraudulent, (b) feedback on a probable time period corresponding to fraudulent transactions, and/or (c) feedback on the probable geographical areas where fraud may occur.

The feedback generator may provide an indication of a type of error associated with a rule. In the example of fraudulent transactions, rule errors may be classified according to the following quadrants:

| | |
|---|---|
| True Positive (Needs to be maximized) | False Positive (Needs to be reduced) |
| False Negative (NOP) | True Negative (Needs to be maximized) |

True positives are fraudulent transactions identified by a rule. True positives should be maximized to reduce fraud loss. False negative is a null operation. False positives are transactions that are not fraudulent, but are flagged as fraudulent by the rules (e.g., as shown in FIG. 9). False positives should be minimized, as flagging a false positive as fraudulent impacts genuine transactions and results in negative events such as abandoned transactions, negative publicity, and brand damage. True negatives are non-fraudulent transactions that are not identified as fraudulent by the rules. It is important to maximize true negatives, so transactions that are not fraudulent are not flagged as fraud by the rule systems.

At step 1008, the rule validator transmits rule performance information to the interface. The rule validator may gather a set of rule performance indicators into a response report file. The rule validator may transmit the response report file to the interface via the rules manager API and/or data loader.

By way of the interface, the rule feedback may be received by an automatic rule generator. The automatic rule generator may use the rule feedback to modify the initial rule. As an example, the rule generator may minimize the received objective function output to modify variables in the initial rule. As another example, the rule validator may report that the rule overestimated fraud for transactions valued between $100 and $300. In response, the rule generator may modify the rule to treat transactions in that dollar range differently.

At step 1010, the rule validator may receive a modified rule (which may be an example of a "second rule"). The rule validator may receive the modified rule from the rule generator. If the rule validator receives an modified rule, the rule validator may repeat steps 1004-1008 using the modified rule.

Figure 11:
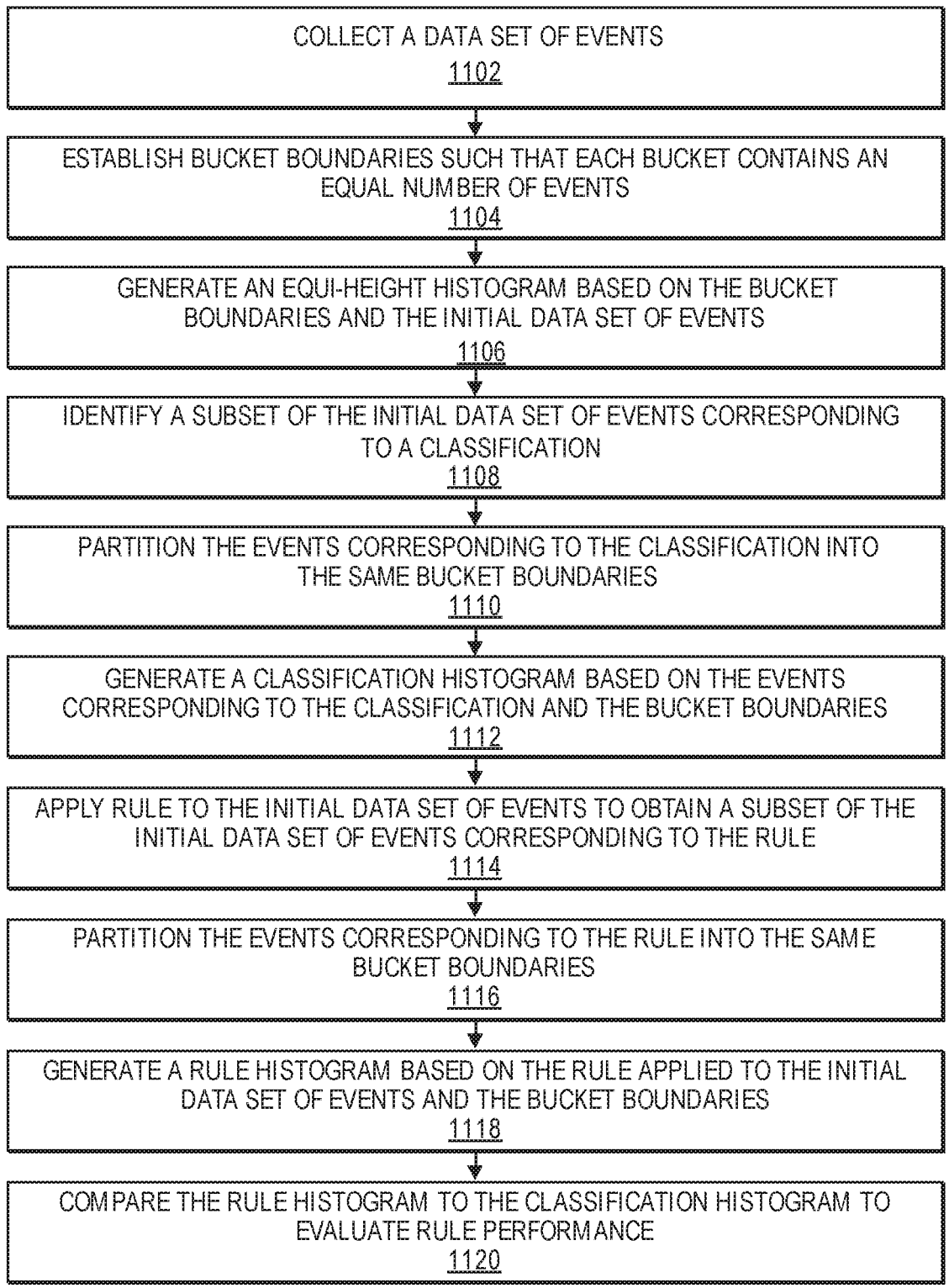
FIG. 11 shows a process flow for evaluating rule performance using histograms according to one or more embodiments.

A method for analyzing rules using histograms is described with respect to FIG. 11. Although the steps are illustrated in a specific order, it is understood that embodiments may include methods that have the steps in different orders. In addition, in some embodiments, steps may be omitted or added.

At step 1102, the event histogram generator collects an initial data set of events. The event histogram generator may retrieve event data from the historical event database. The event data may correspond to a set of events, with values corresponding to multiple data fields for each event. As an example, the data set may include detailed data for each of a set of credit card transactions, including the transaction amount, the transaction location, the transaction time, and details about the cardholder, merchant, and account. The data in the initial data set of events may correspond to either a first classification or a second classification. As an example, some of the data corresponds to fraudulent transactions (first classification). The remaining data corresponds to non-fraudulent transactions (second classification).

At step 1104, the event histogram generator establishes bucket boundaries based on the initial data set of events. The event histogram generator establishes the bucket boundaries such that each bucket contains an equal number of events. As an example, the event histogram generator divides a data set of 20 million events into 4 buckets. Each bucket contains five million events. The width of each bucket varies, as shown in FIG. 4.

At step 1106, the event histogram generator generates an equi-height histogram (which may be an example of a "first histogram") based on the bucket boundaries and the initial data set of events. An example equi-height histogram is shown in FIG. 4.

At step 1108, the classification histogram generator identifies a subset of the initial data set of events corresponding to a classification. The classification histogram generator may retrieve events from the classification events database. Alternatively, or additionally, the classification histogram generator may query the historical events database to retrieve events corresponding to the classification. As an example, the classification histogram generator may retrieve a data set describing 50,000 fraudulent transactions that occurred during the same time period corresponding to the initial data set of events.

At step 1110, the classification histogram generator partitions the events corresponding to the classification into the same bucket boundaries as used in the equi-height histogram. As an example, referring to FIG. 4, the equi-height histogram establishes four bucket boundaries: 0<amount <100, 100<amount <300, 300<amount<2000, and 2000<amount<10000. The classification histogram generator divides the events corresponding to the classification into four groups based on these boundaries.

At step 1112, the classification histogram generator generates a classification histogram (which may be an example of a "second histogram") based on the events corresponding to the first classification and the bucket boundaries. An example classification histogram is shown in FIG. 5.

At step 1114, the rules histogram generator applies a rule to the initial data set of events to obtain a subset of the initial data set of events corresponding to the rule. As an example, the rule may specify a geographic region and time of day. The rules histogram generator may query the historical event database for events corresponding to the specified geographic region and time of day.

At step 1116, the rules histogram generator partitions the events corresponding to the rule into the same bucket boundaries as established in the equi-height histogram. The rules histogram generator may divide the events selected at step 1114 based on the buckets.

The rules histogram generator may apply the rule to the events based on the equi-height histogram. As an example, the equi-height histogram includes buckets with boundaries corresponding to amounts of $0-$100, $100-300, $300-$2,000, and $2,000-$10,000. The rule specifies "amount>$2,000." Accordingly, the rules histogram generator can apply the rule to the events by simply selecting the data in the bucket corresponding to $2,000-$10,000. As another example, if the rule specifies "amount=$200," the rules histogram generator may apply the rule to the bucket corresponding to $100-$300, without the need to apply the rule to events in other buckets. Accordingly, steps 1114 and 1116 may be executed substantially simultaneously.

At step 1118, the rules histogram generator generates a rule histogram (also referred to herein as a "third histogram") based on the rule applied to the initial data set of events and the bucket boundaries. Example rule histograms are shown in FIGS. 6 and 8.

At step 1120, the feedback generator compares the rule histogram to the classification histogram to evaluate the performance of the rule. The feedback generator may produce an overlaid histogram based on the rule histogram and the classification histogram, as shown in FIGS. 7 and 9. Alternatively, or additionally, the feedback generator may determine quantitative and/or qualitative measures of rule performance, as described above with respect to FIG. 10.

The teachings of this disclosure have a number of advantages. For example, the system can accept rules, and provide feedback thereof, programmatically. Rather than requiring manual user submission of a rule, the system can accept rules via an API as well as provide rule feedback via the API. Thus, the some embodiments provides a closed-loop system enabling the rule generator to automatically modify rules based on real-time feedback. Additionally, the system allows the rule submitter to specify an objective function, so as to receive feedback customized according to the rule submitter's needs.

The teachings of this disclosure have a number of additional advantages. The system can significantly increase the speed at which a rule can be optimized. Traditionally, a rule would be manually submitted. Then, the rule would be evaluated according to the entire body of historical data. Rule feedback would eventually be provided to the rule submitter and manually assessed. The rule submitter might resubmit a rule after manually adjusting parameters over the course of hours or days. Using the teachings of this disclosure, a rule is submitted to the rule validator via an API, enabling connection to an automatic rule generator on the rule submitter side. The rule submitter can configure a rule generator to automatically update and resubmit the rule based on received feedback. This allows the rule to updated be much faster than with prior systems.

Further, as taught in this disclosure, rules are applied to the historical events based on the bins established using the equi-height histogram. Evaluating the rule using data binned in this fashion greatly increases the computational efficiency in evaluating the rules based on large data sets. Conventionally, a rule is run against a large data set of historical transactions (millions or even billions of transactions), which can take minutes to hours. On the other hand, here, the data is divided into equi-height histogram bins prior to rule validation. For example, the rule may select transactions originating in Canada. If the data has already been divided into bins based on location, there could be a bin devoted to Canada or North America already established. Thus, cache of filtered data already exists to be picked up by the rule in seconds or fractions of a second. When this computational efficiency is combined with the automated closed-loop system, rule optimization can be executed almost instantly. Thus, using the teachings of this disclosure, results may be provided hundreds of times faster than possible using traditional means.

Although examples are described in the context of payment transactions, the methods described herein are applicable in other contexts. As an example, some embodiments may be used to control access to a secure network by correlating factors such as location and time of day with unauthorized access attempts. As another example, some embodiments may be used to control access to a secure building.

It should be understood that any of the embodiments can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices.

Such programs may also be encoded and transmitted using carrier signals adapted for transmission via wired, optical, and/or wireless networks conforming to a variety of protocols, including the Internet. As such, a computer-readable medium according to an embodiment may be created using a data signal encoded with such programs. Computer readable media encoded with the program code may be packaged with a compatible device or provided separately from other devices (e.g., via Internet download). Any such computer-readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations will become apparent to those skilled in the art upon review of the disclosure. The scope of the embodiments should, therefore, be determined not with reference to the above description, but instead should be determined with reference to the pending claims along with their full scope or equivalents.

One or more features from any embodiment may be combined with one or more features of any other embodiment without departing from the teachings of this disclosure.

As used herein, the use of "a," "an," or "the" is intended to mean "at least one," unless specifically indicated to the contrary.

What is claimed is:

1. A method comprising:
   i) receiving, by a server computer from a client computer, a first rule comprising one or more variables, the first rule configured to predict that an event is either a first classification or a second classification, wherein the client computer comprises an automatic rule generator;
   ii) applying, by the server computer, the first rule to an initial data set of events, each event associated with the first classification or the second classification, to identify events that are associated with the first classification;
   iii) evaluating, by the server computer, a performance of the first rule;
   iv) providing, by the server computer, data relating to the performance of the first rule to the client computer, wherein the client computer automatically evaluates the performance of the first rule and generates a second rule in response to the data relating to the performance of the first rule;
   v) receiving, by the server computer, the second rule from the client computer
   vi) evaluating, by the server computer, the performance of the second rule, wherein evaluating, by the server computer, the performance of the rules comprises:
      a) generating, by the server computer, one or more first histograms based upon the initial data set of events, the one or more first histograms associated with one or more variables, each first histogram containing a plurality of bins defined by boundaries such that each bin contains an equal number of events;
      b) generating, by the server computer, one or more second histograms by binning the identified events associated with the first classification according to the boundaries;
      c) generating, by the server computer, one or more third histograms by binning events in the initial data set of events associated with the first classification according to the boundaries; and
      d) comparing, by the server computer, the one or more second histograms with the one or more third histograms to identify one or more differences; and
   vii) providing, by the server computer, data relating to the performance of the second rule to the client computer, wherein the client computer automatically evaluates the performance of the second rule and generates a third rule in response to the data relating to the performance of the second rule and performs an action based on applying the third rule.

2. The method of claim 1, wherein comparing, by the server computer, the histograms to identify the one or more differences comprises applying an objective function, obtained via the client computer, to the histograms.

3. The method of claim 1, wherein comparing, by the server computer, the histograms to identify the one or more differences comprises computing a difference between an area in each bin in the one or more second histograms subtracted from an area in a corresponding bin in the one or more third histograms.

4. The method of claim 1, wherein the rules are associated with the one or more variables, the one or more histograms are associated with a first variable, of the one or more variables, and the method further comprises repeating steps b)-d) with the one or more histograms associated with a second variable, of the one or more variables.

5. The method of claim 1, wherein the one or more variables comprise one or more of: a transaction amount, a geographical area, a transaction channel, or a time period.

6. The method of claim 1, wherein the server computer receives the first rule and the second rule from the client computer via an application programming interface (API) exposed to the client computer by the server computer.

7. The method of claim 1, wherein the events comprise transactions, the first classification comprises fraudulent transactions, and the second classification comprises non-fraudulent transactions.

8. A system comprising:
   a server computer comprising:
   a processor; and
   a non-transitory computer-readable medium comprising code, executable by the processor, to implement a method comprising:
   i) receiving, by the server computer from a client computer, a first rule comprising one or more variables, the first rule configured to predict that an event is either a first classification or a second classification, wherein the client computer comprises an automatic rule generator;

ii) applying, by the server computer, the first rule to an initial data set of events, each event associated with the first classification or the second classification, to identify events that are associated with the first classification;

iii) evaluating, by the server computer, a performance of the first rule;

iv) providing, by the server computer, data relating to the performance of the first rule to the client computer, wherein the client computer automatically evaluates the performance of the first rule and generates a second rule in response to the data relating to the performance of the first rule;

v) receiving, by the server computer, the second rule from the client computer vi) evaluating, by the server computer, the performance of the second rule, wherein evaluating, by the server computer, the performance of the rules comprises:

a) generating, by the server computer, one or more first histograms based upon the initial data set of events, the one or more first histograms associated with one or more variables, each first histogram containing a plurality of bins defined by boundaries such that each bin contains an equal number of events;

b) generating, by the server computer, one or more second histograms by binning the identified events associated with the first classification according to the boundaries;

c) generating, by the server computer, one or more third histograms by binning events in the initial data set of events associated with the first classification according to the boundaries; and d) comparing, by the server computer, the one or more second histograms with the one or more third histograms to identify one or more differences; and vii) providing, by the server computer, data relating to the performance of the second rule to the client computer, wherein the client computer automatically evaluates the performance of the second rule and generates a third rule in response to the data relating to the performance of the second rule and performs an action based on applying the third rule.

9. The system of claim 8, wherein comparing, by the server computer, the histograms to identify the one or more differences comprises applying an objective function, obtained via the client computer, to the histograms.

10. The system of claim 8, wherein comparing, by the server computer, the histograms to identify the one or more differences comprises computing a difference between an area in each bin in the one or more second histograms subtracted from an area in a corresponding bin in the one or more third histograms.

11. The system of claim 8, wherein the rules are associated with the one or more variables, the one or more histograms are associated with a first variable, of the one or more variables, and the method further comprises repeating steps b)-d) with the one or more histograms associated with a second variable, of the one or more variables.

12. The system of claim 8, wherein the one or more variables comprise one or more of: a transaction amount, a geographical area, a transaction channel, or a time period.

13. The system of claim 8, wherein the server computer receives the first rule and the second rule from the client computer via an application programming interface (API) exposed to the client computer by the server computer.

14. The system of claim 8, wherein the events comprise transactions, the first classification comprises fraudulent transactions, and the second classification comprises non-fraudulent transactions.

15. A method comprising:

i) transmitting, by a client computer to a server computer, a first rule comprising one or more variables, the first rule configured to predict that an event is either a first classification or a second classification, wherein the client computer comprises an automatic rule generator;

ii) receiving, by the client computer from the server computer, data relating to performance of the first rule, wherein the server computer generated the data relating to the performance of the first rule by applying the first rule to an initial data set of events, each event associated with the first classification or the second classification, to identify events that are associated with the first classification and evaluating the performance of the first rule;

iii) automatically evaluating, by the client computer, the performance of the first rule;

iv) generating, by the client computer, a second rule in response to the data relating to the performance of the first rule;

v) transmitting, by the client computer to the server computer, the second rule;

vi) receiving, by the client computer from the server computer, data relating to the performance of the second rule, wherein evaluating, by the server computer, the performance of the rules comprises:

a) generating, by the server computer, one or more first histograms based upon the initial data set of events, the one or more first histograms associated with one or more variables, each first histogram containing a plurality of bins defined by boundaries such that each bin contains an equal number of events;

b) generating, by the server computer, one or more second histograms by binning the identified events associated with the first classification according to the boundaries;

c) generating, by the server computer, one or more third histograms by binning events in the initial data set of events associated with the first classification according to the boundaries; and d) comparing, by the server computer, the one or more second histograms with the one or more third histograms to identify one or more differences;

vii) automatically evaluating, by the client computer, the performance of the second rule; and viii) generating, by the client computer, a third rule in response to the data relating to the performance of the second rule and performs an action based on applying the third rule.

16. The method of claim 15, further comprising transmitting, by the client computer, an objective function, wherein the server computer applies the objective function to the histograms to identify the one or more differences.

17. The method of claim 15, wherein comparing, by the server computer, the histograms to identify the one or more differences comprises computing a difference between an area in each bin in the one or more second histograms subtracted from an area in a corresponding bin in the one or more third histograms.

* * * * *